United States Patent
Chen-Ho et al.

(10) Patent No.: US 10,213,993 B2
(45) Date of Patent: Feb. 26, 2019

(54) MULTILAYER COMPOSITE ARTICLE

(71) Applicant: 3M INNOVATIVE PROPERTIES COMPANY, St. Paul, MN (US)

(72) Inventors: Kui Chen-Ho, Woodbury, MN (US); Caroline M. Ylitalo, Stillwater, MN (US); Yu Yang, Eden Prairie, MN (US); Yongshang Lu, Woodbury, MN (US); Alan L. Levin, Shrewsbury, MA (US); Hyacinth L. Lechuga, St. Paul, MN (US); Steven H. Kong, Woodbury, MN (US); Suresh S. Iyer, Woodbury, MN (US); Ingrid N. Haugan, New Brighton, MN (US); Mahfuza B. Ali, Mendota Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/105,913

(22) PCT Filed: Dec. 16, 2014

(86) PCT No.: PCT/US2014/070492
§ 371 (c)(1),
(2) Date: Jun. 17, 2016

(87) PCT Pub. No.: WO2015/095123
PCT Pub. Date: Jun. 25, 2015

(65) Prior Publication Data
US 2016/0318287 A1 Nov. 3, 2016

Related U.S. Application Data

(60) Provisional application No. 61/918,093, filed on Dec. 19, 2013.

(51) Int. Cl.
*C08K 3/22* (2006.01)
*C09D 127/12* (2006.01)
(Continued)

(52) U.S. Cl.
CPC ............... *B32B 27/08* (2013.01); *B32B 1/00* (2013.01); *B32B 7/02* (2013.01); *B32B 27/28* (2013.01);
(Continued)

(58) Field of Classification Search
CPC C08F 214/184; C08F 230/08; C08F 230/085; C09D 5/006; C09D 127/12; C09D 143/04
(Continued)

(56) References Cited

U.S. PATENT DOCUMENTS

| 2,637,738 A | 5/1953 | Wagner |
| 4,211,823 A | 7/1980 | Suzuki |

(Continued)

FOREIGN PATENT DOCUMENTS

| CN | 102206299 | 10/2011 |
| JP | 60-64843 | 4/1985 |

(Continued)

OTHER PUBLICATIONS

Machine translation of JP 2001-139885A, May 2001.*
(Continued)

*Primary Examiner* — Ramsey Zacharia
(74) *Attorney, Agent, or Firm* — Julie Lapos-Kuchar

(57) ABSTRACT

Described herein is composite article comprising a substrate; and on at least one face of the substrate a multilayered coating disposed thereon. The multilayered coating comprises (i) an abrasion-resistant layer adjacent to the substrate, wherein the abrasion-resistant layer comprises inorganic oxide nanoparticles and a polymer binder; and (ii) an
(Continued)

antireflection layer adjacent to the abrasion-resistant layer opposite the substrate, wherein the antireflection layer comprises a fluorosilane polymer, wherein the fluorosilane polymer comprises: at least one monomeric unit A represented by the formula (I) wherein $R^1$ represents H or methyl, $L^1$ represents a covalent bond or a divalent aliphatic group having from 1 to 10 carbon atoms, each $Y^1$ independently represents a hydrocarbyl group having from 1 to 6 carbon atoms, each $Y^2$ independently represents a hydrolyzable group, g is 0, 1, or 2; and at least one divalent monomeric unit B represented by the formula (I) wherein $R^2$, $R^3$, and $R^4$ represent H, methyl, trifluoromethyl, or F, wherein at least one of $R^2$, $R^3$, and $R^4$ is F, $R_f^1$ represents a covalent bond or a divalent group selected from the group consisting of —$(CF_2O)_a$—, —$(CF_2CF_2O)_b$—, —$(CF_2CF_2CF_2O)_c$—, —$(CF_2CF_2CF_2CF_2O)_d$—, —$(CF_2CF(CF_3)O)_e$—, and combinations thereof, wherein a, b, c, d, and e represent integers in the range of from 0 to 130, and wherein $1 \le a+b+c+d+e \le 130$, and $R_f^2$ is a perfluoroalkyl group.

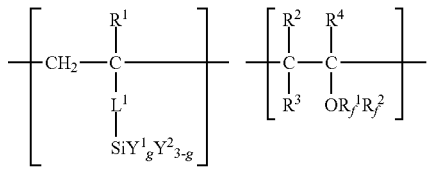

19 Claims, 1 Drawing Sheet

(51) Int. Cl.

| | | |
|---|---|---|
| C09D 143/04 | (2006.01) | |
| B32B 27/08 | (2006.01) | |
| B32B 7/02 | (2006.01) | |
| B32B 27/28 | (2006.01) | |
| B32B 27/30 | (2006.01) | |
| B32B 37/14 | (2006.01) | |
| C09D 133/10 | (2006.01) | |
| B32B 27/36 | (2006.01) | |
| B32B 1/00 | (2006.01) | |
| C09D 7/61 | (2018.01) | |

(52) U.S. Cl.
CPC .......... *B32B 27/308* (2013.01); *B32B 27/365* (2013.01); *B32B 37/14* (2013.01); *C09D 7/61* (2018.01); *C09D 127/12* (2013.01); *C09D 133/10* (2013.01); *C09D 143/04* (2013.01); *B32B 2255/10* (2013.01); *B32B 2255/20* (2013.01); *B32B 2255/24* (2013.01); *B32B 2255/28* (2013.01); *B32B 2264/102* (2013.01); *B32B 2307/554* (2013.01); *B32B 2457/20* (2013.01); *B32B 2551/00* (2013.01); *C08K 3/22* (2013.01)

(58) Field of Classification Search
USPC .................. 428/323–331, 421, 422
See application file for complete search history.

(56) References Cited

U.S. PATENT DOCUMENTS

| | | |
|---|---|---|
| 4,579,965 A | 4/1986 | Kanner |
| 4,737,559 A | 4/1988 | Kellen |
| 4,886,862 A * | 12/1989 | Kuwamura .......... C09D 157/08 525/326.2 |
| 4,929,278 A | 5/1990 | Ashley |
| 4,966,812 A | 10/1990 | Ashley |
| 5,041,595 A | 8/1991 | Yang |
| 5,800,926 A | 9/1998 | Nogami |
| 5,873,931 A | 2/1999 | Scholz |
| 6,210,858 B1 * | 4/2001 | Yasuda .................. B32B 7/02 348/834 |
| 6,238,798 B1 | 5/2001 | Kang |
| 6,255,536 B1 | 7/2001 | Worm |
| 6,261,700 B1 | 7/2001 | Olson |
| 6,277,485 B1 | 8/2001 | Invie |
| 6,340,404 B1 | 1/2002 | Oka |
| 6,376,060 B1 | 4/2002 | Yoshihara |
| 6,376,590 B2 | 4/2002 | Kolb |
| 6,416,178 B1 | 7/2002 | Friedman |
| 6,542,302 B2 | 4/2003 | Cross |
| 6,558,804 B2 | 5/2003 | Sato |
| 6,605,229 B2 | 8/2003 | Steiner |
| 6,660,388 B2 | 12/2003 | Liu |
| 6,777,070 B1 | 8/2004 | Murata |
| 6,791,649 B1 | 9/2004 | Nakamura |
| 6,815,056 B2 | 11/2004 | Choi |
| 6,816,310 B2 | 11/2004 | Cross |
| 7,138,185 B2 | 11/2006 | Obayashi |
| 7,156,530 B2 | 1/2007 | Miyatake |
| 7,241,437 B2 | 7/2007 | Davidson |
| 7,323,514 B2 | 1/2008 | Jing |
| 7,351,470 B2 | 4/2008 | Draheim |
| 7,473,462 B2 | 1/2009 | Coggio |
| 7,491,441 B2 | 2/2009 | Pokorny |
| 7,553,514 B2 | 6/2009 | Fan |
| 7,592,121 B2 | 9/2009 | Muramatsu |
| 7,615,283 B2 | 11/2009 | Radcliffe |
| 7,651,776 B2 | 1/2010 | Yoshioka |
| 7,655,298 B2 | 2/2010 | Thies |
| 7,678,462 B2 | 3/2010 | Kennedy |
| 7,703,456 B2 | 4/2010 | Yahiaoui |
| 8,112,896 B2 | 2/2012 | Ferrari |
| 8,142,896 B2 | 3/2012 | Biteau et al. |
| 8,163,357 B2 | 4/2012 | Engardio |
| 8,202,573 B2 | 6/2012 | Pokorny |
| 8,241,740 B2 | 8/2012 | Fukushige |
| 8,343,624 B2 | 1/2013 | Walker, Jr. |
| 2005/0239933 A1 | 10/2005 | Lee |
| 2006/0147674 A1 | 7/2006 | Walker, Jr. |
| 2006/0147703 A1 | 7/2006 | Walker, Jr. |
| 2006/0147723 A1 | 7/2006 | Jing |
| 2006/0147724 A1 | 7/2006 | Mizuno |
| 2006/0204655 A1 | 9/2006 | Takahashi |
| 2007/0009176 A1 | 1/2007 | Lim |
| 2007/0286992 A1 | 12/2007 | Coggio et al. |
| 2007/0286993 A1 | 12/2007 | Radcliffe et al. |
| 2008/0239486 A1 | 10/2008 | Kato |
| 2008/0274352 A1 | 11/2008 | Hao |
| 2009/0207492 A1 * | 8/2009 | Horio .................. C08J 7/042 359/507 |
| 2010/0035039 A1 | 2/2010 | Jing |
| 2010/0165276 A1 | 7/2010 | David |
| 2010/0246014 A1 * | 9/2010 | Asahi .................. G02B 1/111 359/585 |
| 2011/0003130 A1 | 1/2011 | Marchet et al. |
| 2011/0136999 A1 * | 6/2011 | Hung .................. C08F 8/00 526/222 |
| 2012/0040190 A1 | 2/2012 | You |
| 2013/0034653 A1 | 2/2013 | Kumar |
| 2013/0216820 A1 | 8/2013 | Riddle |
| 2013/0225760 A1 | 8/2013 | Jing |

FOREIGN PATENT DOCUMENTS

| | | | |
|---|---|---|---|
| JP | 11-199860 | | 7/1999 |
| JP | 2001-040211 | | 2/2001 |
| JP | 2001139885 A | * | 5/2001 |
| JP | 2002022905 A | * | 1/2002 |
| JP | 2002-122820 | | 4/2002 |
| JP | 3485650 | | 1/2004 |

(56) References Cited

FOREIGN PATENT DOCUMENTS

| | | |
|---|---|---|
| JP | 2009-024116 | 2/2005 |
| JP | 2007-051053 | 3/2007 |
| JP | 2009-120700 | 6/2009 |
| JP | 2010-222199 | 10/2010 |
| WO | WO 1998-28307 | 7/1998 |
| WO | WO 1999-64899 | 12/1999 |
| WO | WO 2002-12404 | 2/2002 |
| WO | WO 2007-053772 | 5/2007 |
| WO | WO 2007-073007 | 6/2007 |
| WO | WO-2012080159 A1 * | 6/2012 ............... B60C 1/00 |
| WO | WO 2012-106507 | 8/2012 |
| WO | WO 2014-209574 | 12/2014 |
| WO | WO 2015-200003 | 12/2015 |

OTHER PUBLICATIONS

Machine translation of JP 2002-022905A, Jan. 2002.*
International Search Report for PCT International Application No. PCT/US2014/070492 dated Apr. 8, 2015, 4 pages.

* cited by examiner

MULTILAYER COMPOSITE ARTICLE

TECHNICAL FIELD

A multilayer composite article having good abrasion resistance and good antireflective properties is described.

SUMMARY

There is a need to develop a coating composition that can be applied to a wide shape range of substrates, including complex curved substrates. There is also a desire to identify a coating composition that is more cost effective and/or curable at relatively low temperature. Ideally, these coating compositions can be applied to a wide range of substrates by, for example, dip coating, flow coating, spin coating, or roll-to-roll coating applications. It is also desirable to identify an article, which has antireflective, abrasion-resistant, antistatic, and/or easy clean characteristics.

In one aspect, a composite article is described comprising: a substrate; and on at least one face of the substrate, a multilayered coating is disposed, wherein the multilayered coating comprises: (i) an abrasion-resistant layer adjacent to the substrate, wherein the abrasion-resistant layer has an index of refraction greater than 1.55, wherein the abrasion-resistant layer comprises inorganic oxide nanoparticles and a polymer binder; and (ii) an antireflection layer adjacent to the abrasion-resistant layer opposite the substrate, wherein the antireflection layer has an index of refraction less than 1.48, and wherein the antireflection layer comprises a fluorosilane polymer, wherein the fluorosilane polymer comprises:

at least one monomeric unit A represented by the formula

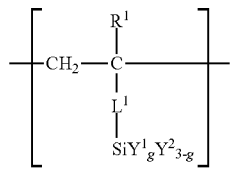

wherein
$R^1$ represents H or methyl,
$L^1$ represents a covalent bond or a divalent aliphatic group having from 1 to 10 carbon atoms,
each $Y^1$ independently represents a hydrocarbyl group having from 1 to 6 carbon atoms,
each $Y^2$ independently represents a hydrolyzable group,
g is 0, 1, or 2; and
at least one divalent monomeric unit B represented by the formula

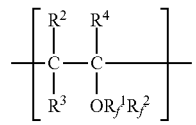

wherein
$R^2$, $R^3$, and $R^4$ represent H, methyl, trifluoromethyl, or F, wherein at least one of $R^2$, $R^3$, and $R^4$ is F,
$R_f^1$ represents a covalent bond or a divalent group selected from the group consisting of $-(CF_2O)_a-$, $-(CF_2CF_2O)_b-$, $-(CF_2CF_2CF_2O)_c-$, $-(CF_2CF_2CF_2CF_2O)_d-$, $-(CF_2CF(CF_3)O)_e-$, and combinations thereof, wherein a, b, c, d, and e represent integers in the range of from 0 to 130, and wherein $1 \leq a+b+c+d+e \leq 130$, and
$R_f^2$ is a perfluoroalkyl group.

In another aspect, a method of making a composite article is described, the method comprising:
providing a substrate;
disposing an abrasion-resistant layer on at least a portion of the substrate, wherein the abrasion-resistant layer has an index of refraction greater than 1.55, wherein the abrasion-resistant layer comprises inorganic oxide nanoparticles and a polymer binder; and
disposing an antireflection layer on at least a portion of the abrasion-resistant layer opposite the substrate, wherein the antireflection layer has an index of refraction less than 1.48, and wherein the antireflection layer comprises a fluorosilane polymer, wherein the fluorosilane polymer comprises:
at least one monomeric unit A represented by the formula

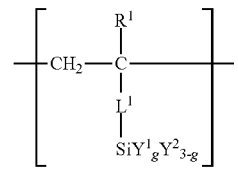

wherein
$R^1$ represents H or methyl,
$L^1$ represents a covalent bond or a divalent aliphatic group having from 1 to 10 carbon atoms,
each $Y^1$ independently represents a hydrocarbyl group having from 1 to 6 carbon atoms,
each $Y^2$ independently represents a hydrolyzable group,
g is 0, 1, or 2; and
at least one divalent monomeric unit B represented by the formula

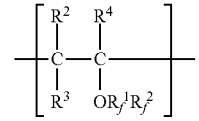

wherein
$R^2$, $R^3$, and $R^4$ represent H, methyl, trifluoromethyl, or F, wherein at least one of $R^2$, $R^3$, and $R^4$ is F,
$R_f^1$ represents a covalent bond or a divalent group selected from the group consisting of $-(CF_2O)_a-$, $-(CF_2CF_2O)_b-$, $-(CF_2CF_2CF_2O)_c-$, $-(CF_2CF_2CF_2CF_2O)_d-$, $-(CF_2CF(CF_3)O)_e-$, and combinations thereof, wherein a, b, c, d, and e represent integers in the range of from 0 to 130, and wherein $1 \leq a+b+c+d+e \leq 130$, and $R_f^2$ is a perfluoroalkyl group.

In yet another aspect, a composition is described comprising:
a) a fluorosilane polymer comprising:
at least one monomeric unit A represented by the formula

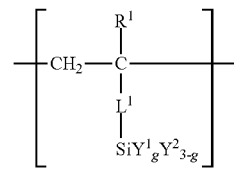

wherein
R¹ represents H or methyl,
L¹ represents a covalent bond or a divalent aliphatic group having from 1 to 10 carbon atoms,
each Y¹ independently represents a hydrocarbyl group having from 1 to 6 carbon atoms,
each Y² independently represents a hydrolyzable group,
g is 0, 1, or 2; and
at least one divalent monomeric unit B represented by the formula

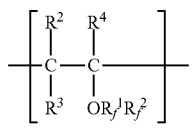

wherein
R², R³, and R⁴ represent H, methyl, trifluoromethyl, or F, wherein at least one of R², R³, and R⁴ is F,
$R_f^1$ represents a covalent bond or a divalent group selected from the group consisting of —(CF$_2$O)$_a$—, —(CF$_2$CF$_2$O)$_b$—, —(CF$_2$CF$_2$CF$_2$O)$_c$—, —(CF$_2$CF$_2$CF$_2$CF$_2$O)$_d$—, —(CF$_2$CF(CF$_3$)O)$_e$—, and combinations thereof, wherein a, b, c, d, and e represent integers in the range of from 0 to 130, and wherein 1≤a+b+c+d+e≤130, and
$R_f^2$ is a perfluoroalkyl group; and
b) inorganic nanoparticles.

The above summary is not intended to describe each embodiment. The details of one or more embodiments of the invention are also set forth in the description below. Other features, objects, and advantages will be apparent from the description and from the claims.

Figure 1:
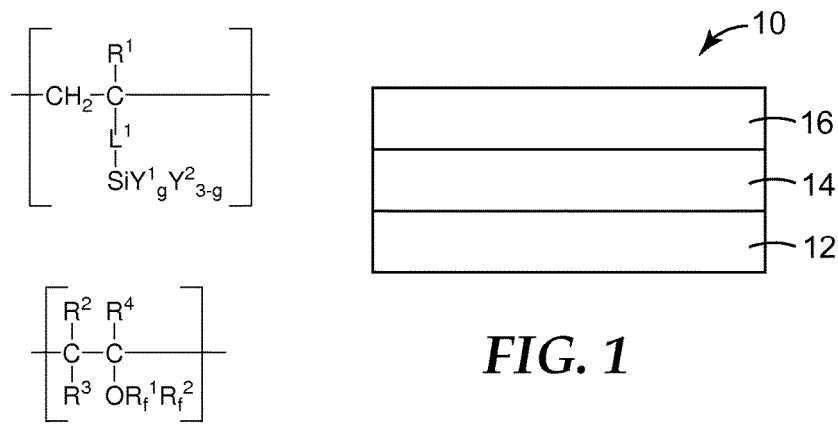
FIG. 1 is a schematic side view of exemplary composite article 10 according to the present disclosure.

It should be understood that numerous other modifications and embodiments can be devised by those skilled in the art, which fall within the scope and spirit of the principles of the disclosure. The figure may not be drawn to scale.

DETAILED DESCRIPTION

As used herein, the term
"a", "an", and "the" are used interchangeably and mean one or more;
the term "aliphatic" refers to any organic group or molecule that does not contain an aromatic moiety;
the term "alkene" refers to an ethylenically-unsaturated compound consisting of carbon and hydrogen atoms; and
the term "fluorinated alkene" refers to an alkene wherein one or more hydrogen atoms have been replaced by fluorine atom(s).
the prefix "(meth)acryl" means "acryl" and/or "methacryl".
and
"and/or" is used to indicate one or both stated cases may occur, for example A and/or B includes, (A and B) and (A or B).

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

Antireflective coatings are applied to articles, such as optical devices (e.g., lens, displays) to reduce reflection and/or improve the light transmission. Traditionally cost effective one-layer antireflective performance is accomplished by applying a thin layer of a low index of refraction composition at the interface between a substrate and air. Typically, antireflective coatings require UV curing (e.g., as disclosed in U.S. Pat. Publ. No. 2006/0147723), which is not ideal for non-planar substrates such as those that are complex curved or samples that are not UV stable. Alternatively, a high temperature sintering process can be used for curing antireflective coatings, however, this process is not ideal for plastic substrates, which can melt at the sintering temperatures. In another method, such as that disclosed in U.S. Pat. No. 6,816,310, chemical vapor deposition is used to apply an antireflective layer onto a substrate, however, this process can be costly. For applications that require a dip coating process, such as when coating complex shaped objects, especially those made of organic polymers, relatively low-temperature thermally curable compositions are needed.

The present disclosure is directed toward a multilayered composite article comprising at least two thermally curable coating layers applied onto a substrate. The first coating layer adjacent to the substrate is an abrasion-resistant composition having a relatively high index of refraction, while the second coating layer is an antireflective composition having a relatively low index of refraction. The first layer provides good adhesion to the substrate and/or an increase in durability, while the second layer comprises a fluorosilane polymer and provides antireflective properties as well as an anti-soiling, low surface energy coating.

An exemplary composite article of the present disclosure is shown in FIG. 1. Composite article 10 includes substrate 12 and on one face, a multilayered coating comprising abrasion-resistant layer 14 and antireflective layer 16. Antireflective layer 16 is positioned to be exposed to the atmosphere while abrasion-resistant layer 14 is positioned between substrate 12 and antireflective layer 16. Although FIG. 1 exemplifies only one face of the substrate comprising a multilayered coating, other faces of the substrate may also comprise the multilayered coating.

While not shown, other layers besides the antireflective layer and the abrasion-resistant layer may be incorporated into the composite article, including, but not limited to, other hard coating layers, adhesive layers, primer layers, light diffusing coating, diffraction gratings, and other microstructures, and the like. Preferably, the antireflection layer is coupled to the abrasion-resistant layer.

Substrate

The substrate of the present disclosure may be an organic substrate, meaning that the substrate comprises carbon atoms, or an inorganic substrate. Exemplary substrates include polycarbonate, polyethylene terephthalate (PET), acrylonitrile butadiene styrene (ABS), polyvinyl chloride (PVC), cellulose acetate butyrate (CAB), glass, and combinations thereof.

The substrate may be planar, curved, or complex curved. The constructions disclosed herein may be particularly useful for non-planar substrates, for example substrates that are injection molded having more than one curve.

Substrates on which the multilayered coatings may be disposed include, for example, plastic film, molded plastic parts, painted and/or clear coated automotive body panels, marine surfaces (e.g., hulls and trim), motorcycle parts, touch screens, and optical displays.

Abrasion-Resistant Layer

The abrasion-resistant layer is a high refractive index layer, having an index of refraction of greater than 1.55, 1.58, or even 1.60. The maximum reflective index of the abrasion-resistant layer is typically no greater than 1.80.

The abrasion-resistant layer comprises a polymer binder. Such polymer binders include a conventional carbon-based polymeric composition having mono and multi-acrylate crosslinking systems, polyurethanes, and polyamides. Exemplary polymer binders include: an acrylic polymer, polyurethanes, polyamides. In one embodiment, the acrylic polymer comprises quaternary ammonium groups.

In one embodiment, a crosslinking agent may be used. Exemplary crosslinking agents may include carbodiamide crosslinkers, such as those available from Nisshinbo Industries, Inc. Japan under the trade designation "V-04"; and melamine crosslinkers such as those available from Stahl USA under the trade designation "XR-9174" and from CYTEC Surface Specialties, Inc. under the trade designation "CYMEL 327". Preferred crosslinkers include aliphatic and aromatic polyisocyanates such as available from Bayer Materials Science under the trade designation "DESMO-DUR" including Desmodur L-75 and Desmodur XP2838. Mixtures of cross-linkers can also be useful.

The abrasion-resistant layer may be cross-linked for example by exposure to ultraviolet radiation using H-bulb or other lamp operating at a desired wavelength; or by heating in a convection oven or by exposure to infra red radiation as is known in the art.

In one embodiment, the abrasion-resistant layer is transparent, meaning it has visible light (400-700 nm) transmission of at least 85%, or even 90%.

In one embodiment, the abrasion-resistant layer is antistatic, meaning it exhibits static charge dissipation time of less than 60 seconds, or having a static charge retention of between −200 V and +200 V after a rubbing test as described in the Antistatic Efficiency Measurement test method described below.

In one preferred embodiment, the mechanical durability of the abrasion-resistant layer can be enhanced by the introduction of inorganic particles, particularly high refractive index particles.

Various high refractive index particles are known including for example zirconia ("$ZrO_2$"), titania ("$TiO_2$"), antimony oxides, alumina, tin oxides, alone or in combination. Mixed metal oxide may also be employed. The refractive index of the high refractive index particles is at least 1.60, 1.65, 1.70, 1.75, 1.80, 1.85, 1.90, 1.95, or 2.00.

In one embodiment, the inorganic particles are zirconia. Zirconias for use in the abrasion-resistant layer are available from Nalco Chemical Co. under the trade designation "NALCO OOSSOO8" and from Buhler AG Uzwil, Switzerland under the trade designation "BYHLER ZIRCONIA Z-WO SOL". Zirconia nanoparticles can also be prepared such as described in U.S. Pat. No. 7,241,437 and U.S. Pat. No. 6,376,590.

In one embodiment, the surface of the inorganic particle is modified. The surface of the particles may be modified with polymer coatings designed to have alkyl or fluorinated alkyl groups, and mixtures thereof that have reactive functionality towards the polymer binder. Such functionalities include mercaptan, vinyl, acrylate and others believed to enhance the interaction between the inorganic particles and polymer binders, especially those containing chloro, bromo, iodo or alkoxysilane cure site monomers. Specific surface modifying agents contemplated by this invention include but are not limited to 3-methacryloxypropyltrimethoxysilane (A174, OSI Specialties Chemical), vinyl trialkoxy silanes such as trimethoxy and triethoxy silane and hexamethydisilane (available from Aldrich Co).

A combination of surface modifying agents can be useful, wherein at least one of the agents has a functional group co-polymerizable with a hardenable resin. Combinations of surface modifying agent can result in lower viscosity. For example, the polymerizing group can be ethylenically unsaturated or a cyclic function subject to ring opening polymerization. An ethylenically unsaturated polymerizing group can be, for example, an acrylate or methacrylate, or vinyl group. A cyclic functional group subject to ring opening polymerization generally contains a heteroatom such as oxygen, sulfur or nitrogen, and preferably a 3-membered ring containing oxygen such as an epoxide.

The surface modification of the particles can be accomplished in a variety of known ways, such as described in previously cited U.S. Pat. No. 7,241,437 and U.S. Pat. No. 6,376,590; incorporated herein by reference.

The inorganic particles preferably have a substantially monodisperse size distribution or a polymodal distribution obtained by blending two or more substantially monodisperse distributions. Alternatively, the inorganic particles can be introduced having a range of particle sizes obtained by grinding the particles to a desired size range. The inorganic oxide particles are typically non-aggregated (substantially discrete), as aggregation can result in optical scattering (haze) or precipitation of the inorganic oxide particles or gelation. The inorganic oxide particles are typically colloidal in size, having an average particle diameter of 5 nanometers to 100 nanometers. The particle size of the surface-modified inorganic particles is preferably less than about 50 nm in order to be sufficiently transparent. The average particle size of the inorganic oxide particles can be measured using transmission electron microscopy to count the number of inorganic oxide particles of a given diameter. The monomodal particle distribution is preferred for transparency.

The concentration of inorganic nanoparticles is typically no greater than 80 wt % solids of the dried coating. In some embodiments, it is preferred to include 35 to 70 wt % solids of the inorganic nanoparticles in the abrasion-resistant layer.

In one embodiment, the thickness of the abrasion resistance layer is less than 10%, 1% or even 0.5% of the total construction. In one embodiment, the abrasion-resistant layer typically has a thickness of at least 0.5 microns, 1 micron, or even 2 microns; and typically no greater than 10 microns.

Antireflection Layer

The antireflection layer is a low refractive index layer, having an index of refraction of less than 1.48, 1.46, 1.44, or even 1.40. The minimum refractive index of the antireflection layer is typically at least about 1.35. The difference in refractive index between the abrasion-resistant layer and antireflection layer is typically at least 0.05, or even 0.1.

The antireflection layer comprises a fluorosilane polymer, wherein the fluorosilane polymer comprises: at least one divalent monomeric unit A and at least one divalent monomeric unit B.

Monomeric unit A is represented by the formula

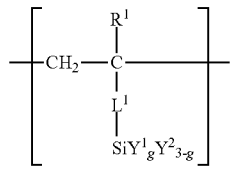

wherein $R^1$ represents H or methyl.

$L^1$ represents a covalent bond (i.e., between the carbon and silicon atoms) or a divalent aliphatic group having from 1 to 10 carbon atoms. Examples of suitable divalent aliphatic groups include: divalent alkylene groups (e.g., methylene, ethylene, 1,2-propylene, 1,3-propylene, 1,4-butylene, 1,6-hexylene, 1,8-octylene, 1,9-nonylene, and 1,10-decylene); and —C(=O)O(CH$_2$)$_v$— wherein v represents 2, 3, 4, or 5; —O(CH$_2$)$_p$— wherein p represents 2, 3, 4, 5, or 6. In some embodiments, $L^1$ is preferably a covalent bond.

Each $Y^1$ independently represents a hydrocarbyl group having from 1 to 6 carbon atoms, hydrocarbyl group (generally non-hydrolyzable) having from 1 to 6 carbon atoms. Examples of $Y^1$ include methyl, ethyl, propyl, isobutyl, pentyl, cyclohexyl, and phenyl.

Each $Y^2$ independently represents a hydrolyzable group. The term "hydrolyzable group" in connection with the present invention refers to a group which either is directly capable of undergoing condensation reactions under typical condensation reaction conditions, or which is capable of hydrolyzing under these conditions, thereby yielding a compound, which is capable of undergoing condensation reactions. Examples of hydrolyzable groups include halo groups (e.g., chloro, bromo, iodo), alkoxy groups (e.g., alkoxy groups having from 1 to 4 carbon atoms, preferably 1 or 2 carbon atoms), aryloxy groups (e.g., phenoxy groups), hydroxyl, and alkanoyloxy groups having from 2 to 4 carbon atoms (e.g., acetoxy, propanoyloxy, butanoyloxy). Typical condensation reaction conditions include acidic or basic conditions.

g is 0, 1, or 2, preferably 0.

Such monomeric units may be derived from monomers such as ethylenically unsaturated hydrolyzable silanes and methods of making them are described in WO 98/28307 A1 (Ceska et al.). Monomeric units may also be derived from commercially available monomers such as free-radically polymerizable hydrolyzable silanes including allyltrichlorosilane; allyltriethoxysilane; allyltrimethoxysilane; vinyltri-t-butoxysilane; vinyltriacetoxysilane; vinyltrichlorosilane; vinyltriethoxysilane; vinyltriisopropenoxysilane; vinyltriisopropoxysilane; vinyltrimethoxysilane; vinyltriphenoxysilane; vinyltris(1-methoxy-2-propoxy)silane; and vinyltris(2-methoxyethoxy)silane, all of which are available from Gelest, Inc., Morrisville, Pa. Other suitable monomers include vinyldimethylmethoxysilane, vinyldimethylethoxysilane, vinylmethyldimethoxysilane, vinylmethyldiethoxysilane, vinylethyldiethoxysilane.

Suitable monomeric units may also be derived from vinyl alkoxysilanes which may be prepared by catalyzed hydrosilylation reactions of alkoxysilanes and acetylene. Another approach involves reaction of vinylchlorosilane with an alcohol. Methods of preparation are described in U.S. Pat. No. 2,637,738 (Wagner); U.S. Pat. No. 4,579,965 (Kenner et al.); and U.S. Pat. No. 5,041,595 (Yang et al.). Vinyl alkoxysilanes are also commercially available, for example from Sigma-Aldrich Co. and Gelest Inc.

Monomeric unit B is represented by the formula

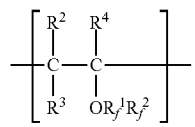

$R^2$, $R^3$, and $R^4$ represent H, methyl, trifluoromethyl, or F, wherein at least one of $R^2$, $R^3$, and $R^4$ is F. In some embodiments, at least two of $R^2$, $R^3$, and $R^4$ are F. In some embodiments, $R^2$ and $R^3$ are F, and $R^4$ is F or trifluoromethyl.

$R_f^1$ represents a covalent bond or a divalent group selected from the group consisting of —(CF$_2$O)$_a$—, —(CF$_2$CF$_2$O)$_b$—, —(CF$_2$CF$_2$CF$_2$O)$_c$—, —(CF$_2$CF$_2$CF$_2$CF$_2$O)$_d$—, —(CF$_2$CF(CF$_3$)O)$_e$—, and combinations thereof, wherein a, b, c, d, and e represent integers in the range of from 0 to 130.

In some embodiments, 1≤a+b+c+d+e≤130. In some embodiments, 2≤a+b+c+d+e≤130. In some embodiments, at least one of a, b, c, d, or e represents an integer in the range of from 1 or 2 to 130, preferably 1 or 2 to 80, more preferably 1 or 2 to 50, and more preferably 1 or 2 to 40. In some embodiments, at least one of a, b, c, d, or e represents an integer in the range of from 1 or 2 to 10, preferably 1 or 2 to 5. In some embodiments, 1≤a+b+c+d+e≤50. In some embodiments, 2≤a+b+c+d+e≤50. In some embodiments, 10≤a+b+c+d+e≤130. In some embodiments, 10≤a+b+c+d+e≤50. In some embodiments, 30≤a+b+c+d+e≤60. In some embodiments, 4≤a+b+c+d+e≤130, preferably 4≤a+b+c+d+e≤80, more preferably 4≤a+b+c+d+e≤50, more preferably 4≤a+b+c+d+e≤40, and even more preferably 4≤a+b+c+d+e≤40.

Some examples of $R_f^1$ include —(CF$_2$O)$_{20-30}$—, —(CF$_2$CF$_2$O)$_{30-40}$—, —(CF$_2$CF$_2$O)$_{40-50}$—, —(CF$_2$CF$_2$CF$_2$CF$_2$O)$_{20-30}$, —(CF$_2$CF(CF$_3$)O)$_{4-8}$—, —(CF$_2$CF(CF$_3$)O)$_{30-40}$—, —(CF$_2$CF$_2$O)$_{30-40}$(CF$_2$CF(CF$_3$)O)$_{30-40}$—, and —(CF$_2$O)$_{20-30}$(CF$_2$CF$_2$O)$_{85-100}$—. When present in combination, the units —(CF$_2$O)—, —(CF$_2$CF$_2$O)—, —(CF$_2$CF$_2$CF$_2$O)—, —(CF$_2$CF$_2$CF$_2$CF$_2$O)—, and —(CF$_2$CF(CF$_3$)O)—, may be present in a random or pseudorandom order and/or in blocks.

$R_f^2$ is a perfluoroalkyl group. Preferably, R has from 1 to 6 carbon atoms. Examples of suitable perfluoroalkyl groups include trifluoromethyl, pentafluoroethyl, nonafluorobutyl, nonafluoroisobutyl, perfluoropentyl, and perfluorohexyl.

Suitable monomeric units for monomeric unit B may be derived from fluorinated vinyl ethers can be prepared, for example, according to methods well known in the art; for example, as described in U.S. Pat. No. 6,255,536 B1 (Worm et al.).

In some embodiments, the average molar ratio of monomeric unit(s) A to monomeric unit(s) B is at least 1 (e.g., at least 10, at least 40, at least 80, at least 100, at least 125, or even at least 150). In some embodiments, the weight ratio of monomeric unit(s) B to monomer unit(s) A is at least 0.8 (e.g., at least 5, at least 10, at least 20, at least 25, or even at least 30).

In one embodiment, the fluorosilane polymer further comprises p monomeric units C represented by the formula

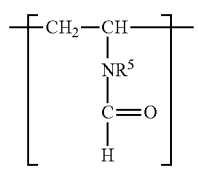

wherein $R^5$ represents H or methyl, wherein p is a positive integer.

If present, monomeric units C are preferably present in an individual or combined amount of less than 20 percent by weight, more preferably less than 10 percent by weight, more preferably less than 2 percent by weight, based on the total weight of the monomers present.

Monomeric unit C may be derived from free-radically polymerizable monomers containing photocrosslinking group containing a photocrosslinkable group such as those disclosed in U.S. Pat. No. 4,737,559 (Kellen et al.). Specific examples include p-acryloxybenzophenone, p-acryloxyethoxybenzophenone, p-N-(methylacryloxyethyl)carbamoylethoxybenzophenone, p-acryloxyacetophenone, o-acrylamidoacetophenone, and acrylated anthraquinones.

In some embodiments, monomeric unit C may be derived from monomers such as alkyl (meth)acrylates having from 4 to 22 carbon atoms (e.g., butyl acrylate, isobornyl acrylate), alkoxyalkyl methacrylates having from 4 to 22 carbon atoms, epoxy acrylates having from 6 to 22 carbon atoms (e.g., glycidyl methacrylate), isocyanatoalkyl (meth)acrylates having from 6 to 22 carbon atoms (e.g., 3-isocyanatopropyl (meth)acrylate)), and combinations thereof.

Preferably, the additional monomers used to form monomeric unit C do not contain multiple free-radically polymerizable groups that would cause crosslinking, although very small amounts of crosslinking resulting in a syrup, for example, are acceptable.

In some embodiments, the combined total all of the free-radically polymerizable monomers in the fluorosilane polymer is less than or equal to 0.49 percent by weight (preferably less than 0.3 percent by weight, more preferably less than 0.1 percent by weight) of fluorinated alkene. In some embodiments, the combined total all of the free-radically polymerizable monomers used in the fluorosilane polymer are free of fluorinated alkene.

The fluorosilane polymer typically has a number and/or weight average molecular weight of at least 10000 g/mol, at least 20000 g/mol, at least 50000 g/mol, at least 150000 g/mol, and/or even at least 200000 g/mol, although this is not a requirement. In order to achieve high molecular weights, the polymerization is preferably carried out without added chain transfer agents (e.g., mercaptans).

Such compositions are disclosed in U.S. Pat. Appl. No. 61/839,122 filed 25 Jun. 2013, the disclosure herein incorporated by reference.

In one embodiment, the antireflection layer is transparent, meaning it has visible light (400-700 nm) transmission of at least 85%, or even 90%.

In one embodiment, the antireflection layer has an optical thickness of about ¼ wave of a wavelength of interest. Such thickness is typically less than 1 micron, more typically less than about 0.5 microns and often about 90 nm to 200 nm. For example, in one embodiment, the antireflection layer has an optical thickness of about a quarter of a wavelength of visible light (400-700 nm) or a multiple thereof. Such thickness is typically about 90 nm to 180 nm and preferably, around 125 nm. In one embodiment, the anti-reflection layer has an optical thickness of about a quarter of a wavelength of infrared light (700 nm-1 mm) or a multiple thereof, for example such thickness may be about 170 nm to 500 nm.

In addition to the refractive index of the antireflection layer, and the thickness of the antireflection layer, the surface roughness of the antireflection layer can also impact the light reflective properties of the resulting coated article. For increased antireflection properties, it is desirable to have a surface roughness with high spatial frequencies. Low frequency roughness will scatter light and not reduce reflection. A perfectly smooth surface will reflect light according to the Fresnel equations. Adding roughness with high spatial frequencies has the potential to provide antireflection properties. In one embodiment, the antireflection layer is nanostructured meaning it has a rough surface.

Surface roughness is a measure of the roughness of a surface. Surface roughness should be measured using a technique such as atomic force microscopy (AFM) that can resolve features in the nanometer range (e.g., at least 1-100 nm or even 5-50 nm). When describing surface roughness, either average roughness (Ra) or root-mean-square roughness (Rq) can be used. Image Rq is the root mean square average of height deviations taken from the mean image data plane, expressed as:

$$\text{Image } Rq = \sqrt{\frac{\sum Z_i^2}{N}}$$

where N is the total number of points and Z is the height at each point (relative to the mean height).

Image Ra is the arithmetic average of the absolute values of the surface height deviations measured from the mean plane, expressed as:

$$\text{Image } Ra = \frac{1}{N}\sum_{j=1}^{N}|Z_j|$$

where N is the total number of points and Z is the height at each point (relative to the mean height).

Fourier analysis of the raw data can be used to examine roughness at different feature sizes or spatial frequencies. A high spatial frequency filter can be used to determine the roughness contribution from nanoscale features. Alternatively, a low pass spatial frequency filter can be used to determine the roughness contribution from large features (e.g., microscale and larger features), which tend to scatter light. When using a low pass spatial frequency filter, a high pass spatial frequency filter may be used in conjunction with the low pass filter to remove waviness in the surface of the sample (i.e., a band pass filter). A rectangular Fourier filter window may be used, however, if ringing artifacts are observed in the filtered data, a Gaussian Fourier filter window may be used instead as is known in the art. See for example, ASME standard B46.1-2009: "Surface Texture: Surface Roughness, Waviness, and Lay". It is understood by those of ordinary skill in the art, that the roughness measurements must be taken in a region of the sample without debris or defects (e.g., unintentional bubbles, pits, scratches, etc.) to be meaningful. Software programs such as those available under the trade designation "VISION" from Bruker Corp., Santa Barbara, Calif. may be used or data processing software such as those available under the trade designation "MATLAB" from MathWorks, Natick, Mass. may be used.

For the high spatial frequency filter, one wants to select a frequency greater than the spatial frequency of the desired light (e.g., visible light), but lower than the resolution limit of the sampled data. In one embodiment, when the high spatial frequency filter is 5000 mm$^{-1}$ the Rq value for the antireflection layer is greater than 0.4, 0.5, 1, 2, 4, or even 6 nm. In one embodiment, when the high spatial frequency filter is 10000 mm$^{-1}$ the Rq value for the antireflection layer is greater than 0.3, 0.4, 0.5, 1, 2, or even 2.5 nm.

In one embodiment, when a low spatial frequency pass band filter of 200 mm$^{-1}$ to 2000 mm$^{-1}$, the Rq value for the antireflection layer is less than 30, 25, 20, 15, 10, 7, or even 5 nm.

In one embodiment, the antireflection layer further comprises silica nanoparticles.

The silica nanoparticles have an average diameter of the primary particle of at least 25 nm, 20 nm, 15 nm, 10 nm, 5 nm or even 3 nm; at most about 200 nm, 100 nm, 50 nm, 30 nm, 20 nm, or even 10 nm depending on the inorganic nanoparticle used. The inorganic nanoparticles used in the antireflection layer are typically un-aggregated. If the inorganic nanoparticles are an aggregation of primary particles, then the maximum cross-sectional dimension of the aggregated nanoparticle is within the range of about 3 nm to about 100 nm, about 3 nm to about 50 nm, about 3 nm to about 20 nm, or even about 3 nm to about 10 nm.

The inorganic nanoparticles of the antireflection layer may be distinguished from materials such as fumed silica, pyrogenic silica, precipitated silica, etc. Such silica materials are known to those of skill in the art as being comprised of primary particles that are essentially irreversibly bonded together in the form of aggregates, in the absence of high-shear mixing. These silica materials have an average size greater than 100 nm (e.g., typically of at least 200 nanometers) and from which it is not possible to straightforwardly extract individual primary particles.

These inorganic nanoparticles may be in the form of a colloidal dispersion. Examples of useful commercially available unmodified silica nanoparticles include commercial colloidal silica sols available from Nalco Chemical Co. (Naperville, Ill.) under the trade designation "NALCO COLLOIDAL SILICAS". For example, such silicas include NALCO products 1040, 1042, 1050, 1060, 2327 and 2329. Other examples of useful commercially available silica nanoparticles include those sold under the trade designation "ORGANOSILICASOL" available from Nissan Chemicals (Houston, Tex.) such as "ORGANOSILICASOL IPA-ST" and "ORGANOSILICASOL IPA-ST-L". In one embodiment, the inorganic nanoparticles comprise anisotropic nanoparticles (e.g., elongated nanoparticles). Examples of the elongated silica nanoparticles include those sold under the trade designation "ORGANOSILICASOL" available from Nissan Chemicals (Houston, Tex.) such as "ORGANOSILICASOL IPA-ST-UP". The inorganic nanoparticles may or may not be surface modified using the chemistries described above.

In one embodiment, the silica nanoparticles used in the antireflection layer are substantially spherical. Sphericity refers to how spherical a particle is. The degree of sphericity of a particle is the ratio of the surface area of a sphere of set volume to the surface area of that particle with the same volume. Substantially spherical means the average degree of sphericity for a plurality of microspheres is at least 0.75, 0.8, 0.85, 0.9, 0.95 or even 0.99, with the theoretical sphericity of 1.0 for a perfect sphere.

Those skilled in the art appreciate that the abrasion-resistant layer and/or the antireflection layer disclosed above can contain other optional adjuvants, such as, surfactants, antistatic agents (e.g., conductive polymers), biocide, preservatives, leveling agents, photosensitizers, ultraviolet ("UV") absorbers, stabilizers, defoamers, antioxidants, lubricants, suspending agents and the like.

The abrasion-resistant layer and the antireflection layer can be formed by conventional methods, including spraying, spin coating, brushing, dipping, flow coating, die coating, etc., but typically are applied by dip coating. Die coaters include knife coaters, slot coaters, slide coaters, fluid bearing coaters, slide curtain coaters, drop die curtain coaters, and extrusion coaters among others. The coating operation can be conducted either in a single stage or by a multiple stage coating procedure, as is well known in the art.

Advantageously, the coating compositions disclosed herein can be applied by dip coating methods. Such coating methods are particularly well suited for non-planar objects for example, injection molded substrates having one or more curves.

In one embodiment, the substrate is contacted with a first coating composition to form an abrasion-resistant coating layer. In one embodiment, the abrasion-resistant coating layer may be thermally cured at a temperature from room temperature to 200° C., from about 90 to 140° C. from a few minutes to hours to form the abrasion-resistant layer. Then the coated object is contacted with a second coating composition to form an antireflection coating layer. The antireflection coating layer may be thermally cured at a temperature from room temperature to 200° C., from about 90 to 140° C. from a few minutes to hours to form the antireflection layer. Generally, the higher the temperature used for the cure, the shorter the cure time. Typical cure times can be from about 30 minutes to 3 hours.

In another embodiment after applying the abrasion-resistant coating layer onto the substrate, the substrate is dried at elevated temperature until the solvent is mostly evaporated. Then the antireflection coating layer is applied on top of the partially cured abrasion-resistant layer, followed by thermally curing both layers simultaneously at a temperature from room temperature to 200° C., from about 90 to 140° C. from a few minutes to hours. This coating and curing method has the advantage of improving the inter layer adhesion between the two coating layers. Moreover, this embodiment shortens the final product manufacture time.

To facilitate coating and/or handling, the first coating and/or the second coating composition may be diluted with solvent; for example, to achieve a desired solids content and/or viscosity. Examples of suitable solvents include: water, aliphatic hydrocarbons (e.g., hexane, heptane, cyclohexane); aromatic solvents (e.g., benzene, toluene, xylene); ethers (e.g., diethyl ether, glyme, diglyme, diisopropyl ether); esters (e.g., ethyl acetate, butyl acetate); alcohols (e.g., ethanol, isopropyl alcohol); ketones (e.g., acetone, methyl ethyl ketone, methyl isobutyl ketone); sulfoxides (e.g., dimethyl sulfoxide); amides (e.g., N,N-dimethylformamide, N,N-dimethylacetamide); halogenated solvents (e.g., ethylchloroform, dichloroethylene, trifluorotoluene); and combinations thereof.

Curing (e.g., at least partial curing) of the first and/or second coating compositions generally occurs by hydrolysis and condensation of the coating composition, and typically occurs spontaneously upon standing and/or solvent evaporation of the coating in air (e.g., air containing water vapor) to form a crosslinked (e.g., through Si—O—Si linkages) reaction product. Heat and/or steam (e.g., superheated steam) may be used to accelerate and/or advance curing of the coating compositions.

The abrasion-resistant layer may be located on one or both sides of the substrate. The antireflection layer may be located on one or both sides of the composite article.

Because the antireflection layer comprises a fluorinated component, the antireflection layer may exhibit low surface energy. The surface energy of the antireflection layer can be characterized by various methods such as dynamic contact angles (i.e., advancing and receding angles), and ink repellency. The advancing contact angle with water of the cured low refractive index layer is typically at least 90°. More preferably, the contact angle is at least 1000 and most preferably at least 1100. Low surface energy is amenable to anti-soiling and ink or stain repellent properties as well as rendering the exposed surface easy to clean.

The multilayer constructions disclosed herein may be employed in a variety of articles, such as for example camera lenses, eyeglass lenses, binocular lenses, mirrors, retroreflective sheeting, automobile windows, building windows, train windows, boat windows, aircraft windows, vehicle headlamps and taillights, display cases, eyeglasses, overhead projectors, stereo cabinet doors, stereo covers, watch covers, PDAs, LCD TV's (direct lit and edge lit), cell phones (including combination PDA/cell phones), touch sensitive screens, wrist watches, car navigation systems, global positioning systems, depth finders, calculators, electronic books, CD and DVD players, projection televisions screens, computer monitors, notebook computer displays, instrument gauges, instrument panel covers, signage such as graphic displays, as well as optical and magneto-optical recording disks, and the like.

Described below are various exemplary embodiments of the present disclosure:

Embodiment 1

A composite article comprising: a substrate; and on at least one face of the substrate, a multilayered coating is disposed, wherein the multilayered coating comprises: (i) an abrasion-resistant layer adjacent to the substrate, wherein the abrasion-resistant layer has an index of refraction greater than 1.55, wherein the abrasion-resistant layer comprises inorganic oxide nanoparticles and a polymer binder; and (ii) an antireflection layer adjacent to the abrasion-resistant layer opposite the substrate, wherein the antireflection layer has an index of refraction less than 1.48, and wherein the antireflection layer comprises a fluorosilane polymer, wherein the fluorosilane polymer comprises:
at least one monomeric unit A represented by the formula

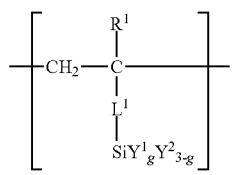

wherein
$R^1$ represents H or methyl,
$L^1$ represents a covalent bond or a divalent aliphatic group having from 1 to 10 carbon atoms, each $Y^1$ independently represents a hydrocarbyl group having from 1 to 6 carbon atoms,
each $Y^2$ independently represents a hydrolyzable group,
g is 0, 1, or 2; and
at least one divalent monomeric unit B represented by the formula

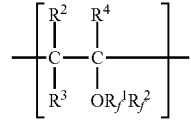

wherein
$R^2$, $R^3$, and $R^4$ represent H, methyl, trifluoromethyl, or F, wherein at least one of $R^2$, $R^3$, and $R^4$ is F,
$R_f^1$ represents a covalent bond or a divalent group selected from the group consisting of —$(CF_2O)_a$—, —$(CF_2CF_2O)_b$—, —$(CF_2CF_2CF_2O)_c$—, —$(CF_2CF_2CF_2CF_2O)_d$—, —$(CF_2CF(CF_3)O)_e$—, and combinations thereof, wherein a, b, c, d, and e represent integers in the range of from 0 to 130, and wherein 1≤a+b+c+d+e≤130, and
$R_f^2$ is a perfluoroalkyl group.

Embodiment 2

A composite article according to embodiment 1, wherein the fluorosilane polymer contains less than or equal to 0.49 percent by weight of fluorinated alkene.

Embodiment 3

A composite article according to any one of the previous embodiments, wherein $R_f^1$ represents a covalent bond or a divalent group selected from the group consisting of —$(CF_2O)_a$—, —$(CF_2CF_2O)_b$—, —$(CF_2CF_2CF_2O)_c$—, —$(CF_2CF_2CF_2CF_2O)_d$—, —$(CF_2CF(CF_3)O)_e$—, and combinations thereof, wherein a, b, c, d, and e represent integers in the range of from 0 to 130, and wherein 2≤a+b+c+d+e≤130.

Embodiment 4

A composite article according to any one of the previous embodiments, wherein the weight ratio of the at least one monomeric unit B to the at least one monomeric unit A is at least 0.8.

Embodiment 5

A composite article according to any one of the previous embodiments, wherein the inorganic oxide nanoparticles comprise zirconia nanoparticles.

Embodiment 6

A composite article according to any one embodiments 1-4, wherein the inorganic oxide nanoparticles comprise surface-modified zirconia nanoparticles.

Embodiment 7

A composite article according to any one of the previous embodiments, wherein the fluorosilane polymer further comprises:

p monomeric units C represented by the formula

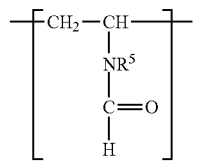

wherein $R^5$ represents H or methyl, wherein p is a positive integer.

Embodiment 8

A composite article according to any one of the previous embodiments, wherein the average molar ratio of the at least one monomeric unit A to the at least one monomeric unit B is at least 1.

Embodiment 9

A composite article according to any one of the previous embodiments, wherein the substrate is a curved film or a complex curve.

Embodiment 10

A composite article according to any one of the previous embodiments, wherein the substrate comprises at least one of a plastic film, an eyewear lens, eyewear protection, and a safety shield.

Embodiment 11

A composite article according to any one of the previous embodiments, wherein the antireflection layer further comprises inorganic nanoparticles.

Embodiment 12

A composite article according to embodiment 11, wherein the inorganic nanoparticles comprise anisotropic silica nanoparticles.

Embodiment 13

A composite article according to any one of the previous embodiments, wherein the polymer binder comprises an acrylic polymer, optionally comprising a quaternary ammonium group.

Embodiment 14

A composite article according to any one of the previous embodiments, wherein the Rq value for the surface topography of the antireflection layer is greater than 0.3 nm after a Fourier spatial filter with a high pass cutoff frequency of 10000 mm$^{-1}$ is applied.

Embodiment 15

A composite article according to any one of the previous embodiments, wherein the Rq value for the surface topography of the antireflection layer is less than 30 nm after a Fourier spatial bandpass filter with a low pass cutoff frequency of 200 mm$^{-1}$ and a high pass cutoff frequency of 2000 mm$^{-1}$ is applied.

Embodiment 16

A composite article according to any one of the previous embodiments, wherein $Y^2$ is selected from the group consisting of alkoxy groups having from 1 to 4 carbon atoms, alkanoyloxy groups having from 2 to 4 carbon atoms, a hydroxyl group, and Cl.

Embodiment 17

A composite article according to any one of the previous embodiments, wherein $R^2$, $R^3$ and $R^4$ represent F.

Embodiment 18

A composite article according to any one of the previous embodiments, wherein the at least one divalent monomeric unit B has an average sum of a+b+c+d+e in the range of from 30 to 40.

Embodiment 19

A composite article according to any one of embodiments 1 to 17, wherein the at least one divalent monomeric unit B has an average sum of a+b+c+d+e in the range of from 4 to 8.

Embodiment 20

A method of making a composite article, the method comprising: providing a substrate; disposing an abrasion-resistant layer on at least a portion of the substrate, wherein the abrasion-resistant layer has an index of refraction greater than 1.55, wherein the abrasion-resistant layer comprises inorganic oxide nanoparticles and a polymer binder; and disposing an antireflection layer on at least a portion of the abrasion-resistant layer opposite the substrate, wherein the antireflection layer has an index of refraction less than 1.48, and wherein the antireflection layer comprises a fluorosilane polymer, wherein the fluorosilane polymer comprises:

at least one monomeric unit A represented by the formula

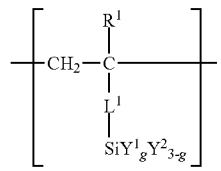

wherein
$R^1$ represents H or methyl,
$L^1$ represents a covalent bond or a divalent aliphatic group having from 1 to 10 carbon atoms,
each $Y^1$ independently represents a hydrocarbyl group having from 1 to 6 carbon atoms,
each $Y^2$ independently represents a hydrolyzable group,
g is 0, 1, or 2; and
at least one divalent monomeric unit B represented by the formula

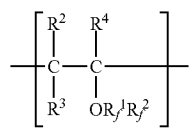

wherein
$R^2$, $R^3$, and $R^4$ represent H, methyl, trifluoromethyl, or F, wherein at least one of $R^2$, $R^3$, and $R^4$ is F,
$R_f^1$ represents a covalent bond or a divalent group selected from the group consisting of $-(CF_2O)_a-$, $-(CF_2CF_2O)_b-$, $-(CF_2CF_2CF_2O)_c-$, $-(CF_2CF_2CF_2CF_2O)_d-$, $-(CF_2CF(CF_3)O)_e-$, and combinations thereof, wherein a, b, c, d, and e represent integers in the range of from 0 to 130, and wherein $1 \leq a+b+c+d+e \leq 130$, and
$R_f^2$ is a perfluoroalkyl group.

Embodiment 21

A method of making a composite article according to embodiment 20, wherein the weight ratio of the at least one monomeric unit B to the at least one monomeric unit A is at least 0.8.

Embodiment 22

A method of making a composite article according to any one of embodiments 20-21, wherein the fluorosilane polymer further comprises:
p monomeric units C represented by the formula

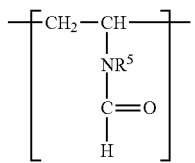

wherein $R^5$ represents H or methyl, wherein p is a positive integer.

Embodiment 23

A method of making a composite article according to any one of embodiments 20-22, wherein the inorganic oxide nanoparticles comprise zirconium oxide nanoparticles.

Embodiment 24

A method of making a composite article according to any one of embodiments 20-23, wherein on a relative molar basis, the fluorosilane polymer comprises from 9 to 11 moles of monomeric unit A, 8 to 10 moles of monomeric unit B, and 0.5 to 1.5 moles of monomeric unit C.

Embodiment 25

A method of making a composite article according to any one of embodiments 20-24, wherein the fluorosilane polymer contains less than or equal to 0.49 percent by weight of fluorinated alkene.

Embodiment 26

A method of making a composite article according to any one of embodiments 20-25, wherein the substrate comprises at least one of a plastic film, an eyewear lens, and a safety shield.

Embodiment 27

A method of making a composite article according to any one of embodiments 20-26, wherein the antireflection layer further comprises silica nanoparticles.

Embodiment 28

A method of making a composite article according to embodiment 27, wherein the silica nanoparticles comprise anisotropic silica nanoparticles.

Embodiment 29

A method of making a composite article according to any one of embodiments 20-28, wherein the antireflection layer further comprises an acrylic polymer.

Embodiment 30

A method of making a composition article according to embodiment 29, wherein the acrylic polymer comprises quaternary ammonium groups.

Embodiment 31

A method of making a composite article according to any one of embodiments 20-30, wherein the antireflection layer has a surface roughness Ra of 2 to 20 nm.

Embodiment 32

A method of making a composite article according to any one of embodiments 20-31, wherein $R_f^1$ represents a covalent bond or a divalent group selected from the group consisting of $-(CF_2O)_a-$, $-(CF_2CF_2O)_b-$, $-(CF_2CF_2CF_2O)_c-$, $-(CF_2CF_2CF_2CF_2O)_d-$, $-(CF_2CF(CF_3)O)_e-$, and combinations thereof, wherein a, b, c, d, and e represent integers in the range of from 0 to 130, and wherein $2 \leq a+b+c+d+e \leq 130$.

Embodiment 33

A method of making a composite article according to any one of embodiments 20-32, wherein the average molar ratio of the at least one monomeric unit A to the at least one divalent monomeric unit B is at least 1.

Embodiment 34

A method of making a composite article according to any one of embodiments 20-33, wherein the substrate is a curved film or a complex curve.

Embodiment 35

A method of making a composite article according to any one of embodiments 20-34, wherein the polymer binder comprises an acrylic polymer.

Embodiment 36

A method of making a composite article according to embodiments 35, wherein the acrylic polymer comprises a quaternary ammonium group.

Embodiment 37

A method of making a composite article according to any one of embodiments 20-36, wherein $Y^2$ is selected from the group consisting of alkoxy groups having from 1 to 4 carbon atoms, alkanoyloxy groups having from 2 to 4 carbon atoms, a hydroxyl group, and Cl.

Embodiment 38

A method of making a composite article according to any one of embodiments 20-37, wherein $R^2$, $R^3$, and $R^4$ represent F.

Embodiment 39

A method of making a composite article according to any one of embodiments 20-38, wherein said at least one divalent monomeric unit B has an average sum of a+b+c+d+e in the range of from 30 to 40.

Embodiment 40

A method of making a composite article according to any one of embodiments 20-38, wherein said at least one divalent monomeric unit B has an average sum of a+b+c+d+e in the range of from 4 to 8.

Embodiment 41

A composition comprising:
a) an fluorosilane polymer comprising:
at least one monomeric unit A represented by the formula

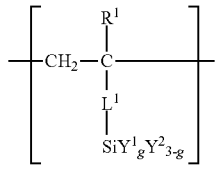

wherein
$R^1$ represents H or methyl,
$L^1$ represents a covalent bond or a divalent aliphatic group having from 1 to 10 carbon atoms,
each $Y^1$ independently represents a hydrocarbyl group having from 1 to 6 carbon atoms,
each Y" independently represents a hydrolyzable group,
g is 0, 1, or 2; and
at least one divalent monomeric unit B represented by the formula

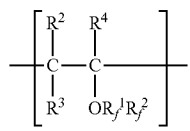

wherein
$R^2$, $R^3$, and $R^4$ represent H, methyl, trifluoromethyl, or F, wherein at least one of $R^2$, $R^3$, and $R^4$ is F, $R_f^1$ represents a covalent bond or a divalent group selected from the group consisting of $-(CF_2O)_a-$, $-(CF_2CF_2O)_b-$, $-(CF_2CF_2CF_2O)_c-$, $-(CF_2CF_2CF_2CF_2O)_d-$, $-(CF_2CF(CF_3)O)_e-$, and combinations thereof, wherein a, b, c, d, and e represent integers in the range of from 0 to 130, and wherein 1≤a+b+c+d+e≤130, and
$R_f^2$ is a perfluoroalkyl group; and
b) inorganic nanoparticles.

Embodiment 42

A composition according to embodiment 41, wherein the inorganic nanoparticles are silica.

Embodiment 43

A composition according to any one of embodiments 41-42, wherein the inorganic nanoparticles comprise anisotropic nanoparticles.

Embodiment 44

A composition according to according to any one of embodiments 41-43, wherein the weight ratio of the at least one monomeric unit B to the at least one monomeric unit A is at least 0.8.

Embodiment 45

A composition according to any one of embodiments 41-44, wherein the fluorosilane polymer contains less than or equal to 0.49 percent by weight of fluorinated alkene.

Embodiment 46

A composition according to any one of embodiments 41-45, wherein $R_f^1$ represents a covalent bond or a divalent group selected from the group consisting of $-(CF_2O)_a-$, $-(CF_2CF_2O)_b-$, $-(CF_2CF_2CF_2O)_c-$, $-(CF_2CF_2CF_2CF_2O)_d-$, $-(CF_2CF(CF_3)O)_e-$, and combinations thereof, wherein a, b, c, d, and e represent integers in the range of from 0 to 130, and wherein 2≤a+b+c+d+e≤130.

Embodiment 47

A composition according to any one of embodiments 41-46, wherein the fluorosilane polymer further comprises:
p monomeric units C represented by the formula

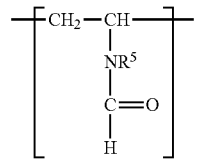

wherein $R^5$ represents H or methyl, wherein p is a positive integer.

Embodiment 48

A composition according to any one of embodiments 41-47, wherein the average molar ratio of the at least one monomeric unit A to the at least one monomeric unit B is at least 1.

Embodiment 49

A composition according to any one of embodiments 38-45, wherein $Y^2$ is selected from the group consisting of alkoxy groups having from 1 to 4 carbon atoms, alkanoyloxy groups having from 2 to 4 carbon atoms, a hydroxyl group, and Cl.

Embodiment 50

A composition according to any one of embodiments 41-49, wherein $R^2$, $R^3$, and $R^4$ represent F.

Embodiment 51

A composition according to any one of embodiments 41-50, wherein said at least one divalent monomeric unit B has an average sum of a+b+c+d+e in the range of from 30 to 40.

Embodiment 52

A composition according to any one of embodiments 41-50, wherein said at least one divalent monomeric unit B has an average sum of a+b+c+d+e in the range of from 4 to 8.

Embodiment 53

An article comprising the cured composition of any one of embodiments 41-52.

Embodiment 54

An article according to embodiment 53, wherein the Rq value for the surface topography of the antireflection layer is greater than 0.3 nm after a Fourier spatial filter with a high pass cutoff frequency of 10000 $mm^{-1}$ is applied.

Embodiment 55

An article according to any one of embodiments 53-54, wherein the Rq value for the surface topography of the antireflection layer is less than 30 nm after a Fourier spatial bandpass filter with a low pass cutoff frequency of 200 $mm^{-1}$ and a high pass cutoff frequency of 2000 $mm^{-1}$ is applied.

Embodiment 56 an article according to any one of embodiments 53-55, wherein the article is a plastic film, an eyewear lens, eyewear protection, and a safety shield.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

These abbreviations are used in the following examples: g=gram, cm=centimeter, kV=kilovolt, mm=millimeter, nm=nanometer, min=minute, ml=milliliter, L=liter, V=volt, S=second, %=percentage, and wt=weight.

Test Methods

Contact Angle Testing

Contact angles were measured for water (deionized water filtered through a filtration system (obtained from Millipore Corporation, Billerica, Mass.)) using a video contact angle analyzer (available as product number DSA 100E from Kruss GmbH, Hamburg, 5 Germany). Reported values are the average of measurements on at least three drops measured on the right and the left sides of the drops. Drops volumes were 1-5 microliters for advancing and receding contact angle measurements.

Ink Repellency Testing

A line was drawn across the surface using a black marker available under the trade designation "SHARPIE" (available from Sanford, Bellwood, Ill.). The sample was visually rated for appearance and for the ability to repel the marker as following: rating of "1" indicated ink beaded into discrete hemispherical droplets; rating of "2" indicated ink beaded into discrete elongated droplets and ink line became discontinuous; rating of "3" indicated ink line narrowed significantly but still continuous; rating of "4" indicated ink line continuous and not narrowed.

Cross-Hatch Adhesion Testing

Using a razor blade, five cross-hatch patterns of squares were generated, over which tape available under the trade designation "3M SCOTCH 810" (3M Co., St. Paul, Minn.) was applied. The tape was pulled rapidly, and the adhesion was qualified by the amount of coating removed from the squares in the cross-hatch patterns. For example, "pass" indicated no coating removal in any square, while "fail" indicated coating in at least one square was removed.

Taber Linear Abrasion Testing

Taber linear abrasion test for abrasion resistance was modified per MCEP Purchase Description GL-PD 10-12 Apr. 16, 2010, with a wear-eraser and 750 grams of added weight. The eraser is rubbed 40 times (20 cycles of out and back) on the indicated substrate. The haze difference between abraded and unabraded areas on the indicated substrate was measured by the Haze-Gard with a reduced (¼" diameter) orifice as described in MCEP Purchase Description GL-PD 10-12 Apr. 16, 2010. The results were reported as a % change in haze.

Antistatic Efficiency Measurements

Static charge decay time was measured using an Electro-Tech Systems, Inc. Model 406C (Glenside, Pa.) static decay meter by charging the sample to +5 kV and measuring the time required for the static charge to decay to 10% of its initial value. Film samples approximately five inches on a side were cut and mounted between the meter electrodes using magnets. The measurements were performed at ambient laboratory humidity of 30-40% and temperature of 22 degree Celsius.

Static charge retention was measured as follows. Samples were initially neutralized with a static neutralizer, and then rubbed 20 times with a dry microfiber cloth. The static charge of the sample surface was measured after 15 minutes with a static charge meter (Model 300B, ACL, Chicago, Ill.), with the distance of the sensing probe and the coating surface of 0.5 inch.

Optical Property Testing

Total transmission (T %) and haze (H %) were measured with a Haze-Gard Plus haze meter (BYK-Gardner, Columbia, Md., USA) as the average of the solar daylight wavelength range (CIE D65 standard illuminant) according to the procedure described in ASTM D1003.

Transmission Spectrum Testing

The light transmission spectrum from 400 to 800 nm was obtained with a Lamda 950 (Perkin-Elmer) spectrophotometer, with a 2 nm interval.

Reflectance Testing

The reflectance (R %) was calculated as an average of reflectance across a reflectance spectrum from 400 to 700 nm as obtained with a BYK Color-Guide Sphere and Gloss, with a 10 nm interval. Reported reflectance and standard deviation were the average of measurements on three different locations of the sample.

Surface Roughness Testing

AFM topography imaging was performed with a Dimension ICON system using the "PeakForce Tapping" and "ScanAsyst" imaging trademarked techniques (Bruker Corporation, Santa Barbara, Calif.). During a surface scan in the "PeakForce Tapping" mode, the tip is driven to oscillation at a frequency well below its resonance peak (the z-position is modulated at 1-2 kHz). Topographic images of 10 m×10 m at 512×512 data points were obtained for this set of samples.

Determination of Surface Roughness

A $1^{st}$ order plane fitting procedure (planefit mode XY) to remove sample tilt and a $0^{th}$ order flatten to remove scan lines or z-offsets was used and each line is fit individually to center data. Data processing was accomplished using Bruker Nanoscope Analysis 1.40. Then the data was manipulated using the data analysis software available under the trade designation "VISION" version 4.20 now available from Bruker Corporation, Santa Barbara, Calif. to apply Fourier filtering. A high frequency surface roughness and a low frequency surface roughness were calculated. For the samples, a high frequency spatial filter of 5000 $mm^{-1}$ and 10,000 $mm^{-1}$ with a Gaussian Fourier filter window was used. For the low frequency spatial filtering, a band pass Fourier filter was used with a low cut off of 200 $mm^{-1}$ and a high cutoff of 2000 $mm^{-1}$ with a Gaussian Fourier filter window.

Materials Table

| Name | Source |
|---|---|
| Polymer A | Synthesized per U.S. Appl. No. 61/839122 (Yang et al.) Example 12, having a structure: |

[Chemical structure showing a polymer with CF$_2$, Si(OMe)$_3$, CF, CF$_2$, CFCF$_3$, O, C$_3$F$_7$, and HN-CHO groups with repeat units n, m, o]

| Name | Source |
|---|---|
| Nanoparticle A | Elongated silica nanoparticle (diameter of 9-15 nm and length of 40-100 nm, solid content by weight of 15.6% in isopropanol) available as under the trade designation "ORGANOSILICASOL IPA-ST-UP" from Nissan Chemical, Houston, TX |
| Nanoparticle B | Spherical silica nanoparticles (10-15 nm diameter, solid content by weight of 30.5% in isopropanol) available as "ORGANOSILICASOL IPA-ST" from Nissan Chemical. |
| Nanoparticle C | Spherical silica nanoparticles (40-50 nm diameter, solid content by weight of 30.8% in isopropanol) available as "ORGANOSILICASOL IPA-ST-L" from Nissan Chemical. |
| DMAEA-MCl | Dimethylaminoethyl acrylate methyl chloride (Ciba, Marietta, GA) |
| IBMA | Isobutyl methacrylate |
| AA | Acrylic acid |
| VAZO-67 | 2,2'-Azobis(2-methylbutyronitrile) available under the trade designation "VAZO-67" from E. I. du Pont de Nemours & Co, Wilmington, DE |
| HCl | Hydrochloric acid |
| Zr-sol | Prepared such as described in U.S. Pat. No. 7,241,437 and U.S. Pat. No. 6,376,590, having a solid content of 45% in water |

Substrate A was a 7 mil (178 micrometers) thick polycarbonate film with a glossy surface on both sides, such as polycarbonate films available under the trade designation "MAKROFOL" from Bayer Material Science LLC, Pittsburgh, Pa.

Substrate B was a curved eyewear lens made of polycarbonate.

Anti-Reflective Layer

Anti-reflective compositions 1 to 11 (ARC-1 to ARC-11) with 3% total solid percentage by weight were prepared by mixing the components as shown in Tables 1A and 1B below.

TABLE 1A

| Amount in grams | ARC-1 | ARC-2 | ARC-3 | ARC-4 | ARC-5 | ARC-6 | ARC-7 |
|---|---|---|---|---|---|---|---|
| Polymer A | 0.00 | 0.05 | 0.10 | 0.15 | 0.20 | 0.25 | 0.30 |
| Nanoparticle A | 3.10 | 2.84 | 2.49 | 2.19 | 1.88 | 1.56 | 1.25 |
| HCl (5% in water) | 0.20 | 0.20 | 0.20 | 0.20 | 0.20 | 0.20 | 0.20 |
| 1-methoxy-2-propanol | 5.25 | 5.50 | 5.75 | 6.00 | 6.27 | 6.53 | 6.79 |
| 4-hydroxy-4-methyl-2-pentanone | 8.13 | 8.13 | 8.13 | 8.13 | 8.13 | 8.13 | 8.13 |
| Weight ratio of Polymer A to Nanoparticle A | 0:100 | 10:90 | 20:80 | 30:70 | 40:60 | 50:50 | 60:40 |

TABLE 1B

| Amount in grams | ARC-8 | ARC-9 | ARC-10 | ARC-11 |
|---|---|---|---|---|
| Polymer A | 0.35 | 0.40 | 0.45 | 0.50 |
| Nanoparticle A | 0.94 | 0.64 | 0.32 | 0.00 |
| HCl (5% in water) | 0.20 | 0.20 | 0.20 | 0.20 |
| 1-methoxy-2-propanol | 7.05 | 7.30 | 7.55 | 7.80 |
| 4-hydroxy-4-methyl-2-pentanone | 8.13 | 8.13 | 8.13 | 8.13 |
| Weight ratio of Polymer A to Nanoparticle A | 70:30 | 80:20 | 90:10 | 100:0 |

Each of the antireflective compositions above was coated onto one side of Substrate A using a Mayer rod #4. The coated sample was then dried in an oven at 130° C. for 30 min. The coated surface of each sample was then tested following the Reflectance testing, Contact angle testing for water, and Ink repellency testing methods described above. The results are reported in Table 2. Also reported in Table 2 are the results of the uncoated substrate A (Substrate A). The coated surface of each sample and uncoated substrate A (Substrate A) were also tested for Surface roughness and the surface roughness was determined using the testing methods described above. For each sample, 2 locations on each sample were analyzed by AFM and the reported Rq value was an average of the two locations. The results are reported in Table 3.

Figure 2:
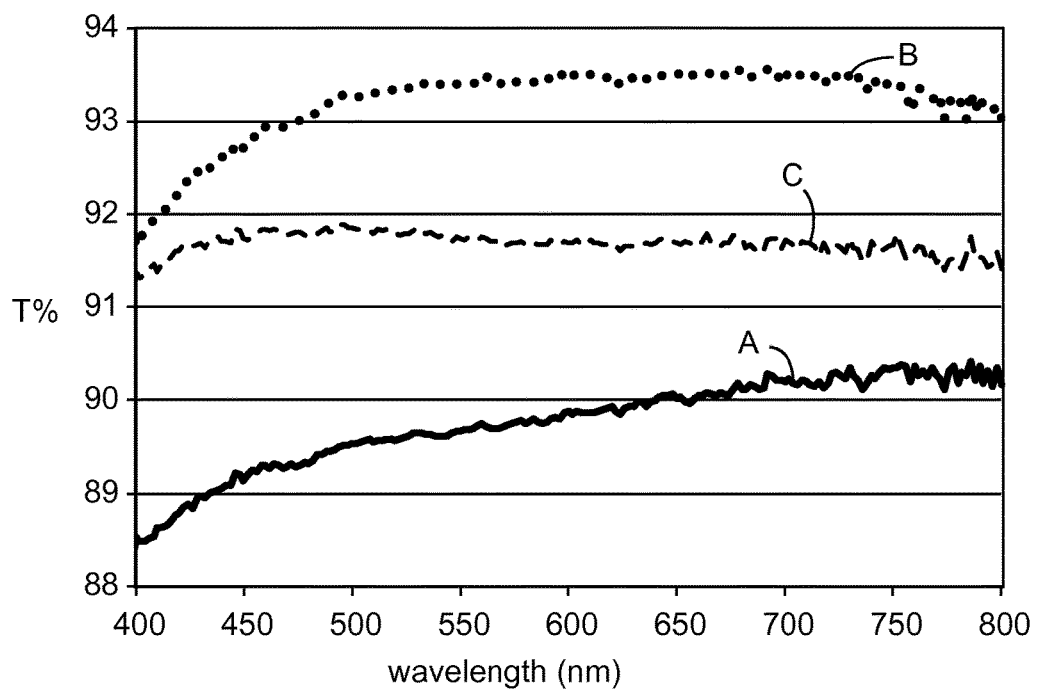
FIG. 2 is a graph of the % transmission (% T) versus wavelength for three different samples, Substrate A, Substrate A coated with ARC-6, and Substrate A coated with ARC-11.

The coated surface of Substrate A coated with ARC-6, the coated surface of Substrate A coated with ARC-11, and uncoated Substrate A were tested following the Transmission spectrum testing method described above. The results are shown in FIG. 2, where A is Substrate A, B is Substrate A coated with ARC-6, and C is Substrate A coated with ARC-11.

TABLE 2

| Anti-reflective Composition | R % (average) | R % (standard deviation) | Contact angle advancing (degree) | Contact angle receding (degree) | Ink repellency |
|---|---|---|---|---|---|
| Substrate A | 4.78 | 0.02 | N/A | N/A | 4 |
| ARC-1 | 3.40 | 0.10 | 32.5 | 5.0 | 4 |
| ARC-2 | 2.89 | 0.20 | 39.9 | 8.0 | 4 |
| ARC-3 | 1.78 | 0.03 | 42.5 | N/A | 4 |
| ARC-4 | 1.26 | 0.16 | 95.0 | 18.6 | 4 |
| ARC-5 | 1.32 | 0.11 | 118.5 | 22.5 | 4 |
| ARC-6 | 1.06 | 0.04 | 120.0 | 23.7 | 4 |
| ARC-7 | 1.46 | 0.04 | 131.9 | 43.5 | 4 |
| ARC-8 | 1.48 | 0.04 | 117.2 | 66.5 | 4 |
| ARC-9 | 2.34 | 0.04 | 120.1 | 75.0 | 3 |
| ARC-10 | 2.51 | 0.06 | 115.8 | 92.0 | 2 |
| ARC-11 | 2.51 | 0.07 | 111.6 | 78.5 | 1 |

N/A means not available

TABLE 3

| Anti-reflective Composition | Rq (high frequency) in nm 5000 mm$^{-1}$ | Rq (high frequency) in nm 10000 mm$^{-1}$ | Rq (low frequency) in nm |
|---|---|---|---|
| Substrate A | 0.36 | 0.25 | 0.38 |
| ARC-1 | 2.85 | 1.88 | 1.77 |
| ARC-2 | 3.20 | 2.12 | 1.98 |
| ARC-3 | 3.55 | 2.34 | 2.14 |
| ARC-4 | 4.19 | 2.74 | 2.39 |
| ARC-5 | 4.97 | 3.02 | 4.75 |
| ARC-6 | 6.20 | 3.68 | 4.58 |
| ARC-7 | 6.98 | 3.76 | 8.01 |
| ARC-8 | 7.34 | 3.78 | 10.59 |
| ARC-9 | 6.33 | 3.21 | 18.98 |
| ARC-10 | 4.36 | 2.14 | 14.73 |
| ARC-11 | 0.47 | 0.34 | 1.30 |

Anti-reflective compositions 12-54 (ARC-12 to ARC-54) were prepared similar to ARC1-ARC11, except for variations in the total solid percentage by weight (which impacted the coating thickness), the type of nanoparticle used, and the weight ratio of Polymer A to nanoparticles as indicated in Table 4. Each of the antireflective compositions above was coated onto one side of Substrate A using a Mayer rod #4. The coated sample was then dried in an oven at 130° C. for 30 min. The coated surface of each sample was then tested following the Reflectance testing method described above. The results of the average and the standard deviation of at least three independently coated samples are reported in Table 4. Also reported in Table 4 are the results of the uncoated substrate A (Substrate A).

TABLE 4

| Anti-reflective Composition | Nanoparticle type | solid % | Weight ratio of Polymer A to Nanoparticle | R % (average) | R % (standard deviation) |
|---|---|---|---|---|---|
| Substrate A | none | none | N/A | 4.78 | 0.02 |
| ARC-12 | none | 2 | 100-0 | 3.41 | 0.04 |
| ARC-13 | none | 3 | 100-0 | 2.39 | 0.04 |
| ARC-14 | none | 4 | 100-0 | 2.23 | 0.20 |
| ARC-15 | none | 5 | 100-0 | 2.40 | 0.02 |
| ARC-16 | A | 2 | 50-50 | 1.82 | 0.16 |
| ARC-17 | A | 3 | 30-70 | 0.99 | 0.03 |
| ARC-18 | A | 3 | 40-60 | 0.69 | 0.06 |
| ARC-19 | A | 3 | 50-50 | 0.78 | 0.12 |
| ARC-20 | A | 3 | 60-40 | 1.42 | 0.05 |
| ARC-21 | A | 3 | 70-30 | 1.86 | 0.07 |
| ARC-22 | A | 4 | 30-70 | 2.59 | 0.47 |
| ARC-23 | A | 4 | 40-60 | 1.72 | 0.18 |
| ARC-24 | A | 4 | 50-50 | 1.36 | 0.05 |
| ARC-25 | A | 4 | 60-40 | 1.45 | 0.04 |
| ARC-26 | A | 4 | 70-30 | 1.66 | 0.10 |
| ARC-27 | A | 4 | 30-70 | 3.15 | 0.47 |
| ARC-28 | A | 4 | 40-60 | 2.15 | 0.41 |
| ARC-29 | A | 4 | 50-50 | 1.53 | 0.39 |
| ARC-30 | A | 4 | 60-40 | 1.60 | 0.02 |
| ARC-31 | A | 4 | 70-30 | 1.74 | 0.02 |
| ARC-32 | A | 5 | 30-70 | 3.64 | 0.07 |
| ARC-33 | A | 5 | 40-60 | 3.42 | 0.04 |
| ARC-34 | A | 5 | 50-50 | 2.33 | 0.12 |
| ARC-35 | A | 5 | 60-40 | 2.20 | 0.20 |
| ARC-36 | A | 5 | 70-30 | 2.33 | 0.15 |
| ARC-37 | B | 2 | 40-60 | 2.71 | 0.02 |
| ARC-38 | B | 2 | 50-50 | 2.93 | 0.10 |
| ARC-39 | B | 2 | 60-40 | 2.90 | 0.05 |
| ARC-40 | B | 3 | 40-60 | 1.95 | 0.13 |
| ARC-41 | B | 3 | 50-50 | 2.06 | 0.08 |
| ARC-42 | B | 3 | 60-40 | 2.10 | 0.03 |
| ARC-43 | B | 4 | 40-60 | 1.74 | 0.10 |
| ARC-44 | B | 4 | 50-50 | 1.48 | 0.36 |
| ARC-45 | B | 4 | 60-40 | 1.95 | 0.21 |
| ARC-46 | C | 2 | 40-60 | 2.53 | 0.18 |
| ARC-47 | C | 2 | 50-50 | 3.10 | 0.03 |
| ARC-48 | C | 2 | 60-40 | 3.03 | 0.02 |
| ARC-49 | C | 3 | 40-60 | 2.03 | 0.10 |
| ARC-50 | C | 3 | 50-50 | 2.00 | 0.08 |
| ARC-51 | C | 3 | 60-40 | 2.36 | 0.05 |
| ARC-52 | C | 4 | 40-60 | 1.69 | 0.04 |
| ARC-53 | C | 4 | 50-50 | 1.85 | 0.08 |
| ARC-54 | C | 4 | 60-40 | 1.90 | 0.01 |

Abrasion-Resistant Layer.

Synthesis of a binder for the abrasion-resistant layer coating composition: The ingredients shown in Table 5 were added into a container, and the mixture was purged with nitrogen for a few minutes. The container was sealed and placed in a 65° C. preheated water bath with constant mixing. The reaction mixture was kept at 65° C. for 17 hours. The viscous reaction mixture was analyzed for % solids. To drive the reaction of the residual monomer to >99.5% completion, an additional 0.1 parts of Vazo-67 was added to the mixture, the solution was purged with nitrogen and sealed. The container was placed in the 65° C. water bath with mixing and heated for another 8 hours. A conversion of (>99.5%) of the monomers was achieved, as evident by % solids calculation. Theoretical solids of the mixture was 25%.

TABLE 5

| Amount in gram | Binder 1 | Binder 2 | Binder 3 |
|---|---|---|---|
| DMAEA-MC1 | 30 | 0 | 30 |
| IBMA | 50 | 80 | 70 |
| AA | 20 | 20 | 0 |
| Isopropanol | 300 | 300 | 300 |
| VAZO-67 | 0.5 | 0.5 | 0.5 |

Synthesis of Zr-GPS for the abrasion-resistant layer coating composition: A reaction bottle was charged with 50 parts of Zr-sol (45% in water), 15 parts of 3-glycidoxypropyltrimethoxysilane (GPS), 22.6 parts of 1-methoxy-2-propanol, and 22.6 parts of isopropanol. The reaction bottle was sealed and heated at 70° C. in a launder-o-meter for 17 hours. Theoretical solids of the mixture was 34%.

Comparative Example A

Non-coated Substrate A.

Comparative Example B 2.0 g of Zr-GPS was coated onto one side of Substrate A with a Mayer rod #14, and dried in an oven at 130° C. for 30 min. The Zr-GPS coating layer was inspected and found to be not cured completely as the coating was soft to the touch.

Comparative Example C

An abrasion-resistant coating solution was prepared using 2.0 g of Zr-GPS, 0.22 g of Binder 1 and 0.80 g of 1-methoxy-2-propanol. The binder was first combined with the 1-methoxy-2-propanol and mixed until well blended. Then the Zr-GPS was added and mixed well. The abrasion-resistant coating solution was first coated on one side of Substrate A with a Mayer rod #14, and dried in an oven at 130° C. for 30 min. The abrasion-resistance coating was inspected and found to be of good quality.

Comparative Example A and the coated side of Comparative Examples B and C were tested following the Antistatic Efficiency Measurement method described above. Comparative Example A and Comparative Example B had an infinite static charge decay time, while Comparative Example C had a static charge decay time of 13.4 seconds.

Example 1

An abrasion-resistant coating solution as described in Comparative Example C was prepared and coated onto one side of Substrate A with a Mayer rod #14, and dried in an oven at 130° C. for 30 min. Then the ARC-6 solution was coated on top of the abrasion-resistant coating with a Mayer rod #4 followed by drying in an oven at 130° C. for 30 min.

Comparative Example A and the coated surface of Example 1 were tested following the Reflectance testing, Optical property testing, Cross-Hatch Adhesion testing, Taber linear abrasion testing and Antistatic Efficiency Measurement test methods described above. The results are shown in Table 6.

TABLE 6

|  | R % | H % | crosshatch adhesion | Taber linear abrasion | Static charge retention (V) |
|---|---|---|---|---|---|
| Comparative Example A | 4.78 | 0.6 | N/A | 55% | +500 |
| Example 1 | 0.90 | 0.4 | PASS | 6% | +100 |

N/A = not applicable

Example 2

An abrasion-resistant coating solution was prepared as described in Comparative Example C using 1 g of Binder 1, 9 g of Zr-GPS, and 3 g of 1-methoxy-2-propanol. The abrasion-resistant coating solution was found to be homogeneous. The abrasion-resistant coating solution was first coated on one side of Substrate A with a Mayer rod #14, and dried in an oven at 130° C. for 30 min. Then the ARC-6 solution was coated on top of the abrasion-resistant coating with a Mayer rod #4 followed by drying in an oven at 130° C. for 30 min.

Comparative Example D

An abrasion-resistant coating solution was made as described in Example 2, except that Binder 2 was used instead of Binder 1. The abrasion-resistant coating solution precipitated and thus, this solution was uncoatable.

Comparative Example E

A sample was made as described in Example 2, except that in the abrasion-resistant coating solution, Binder 3 was used instead of Binder 1 and the abrasion-resistant coating solution was found to be homogeneous.

The coated surface of each of Comparative Example E and Example 2 were tested following the Reflectance testing, and Cross-Hatch Adhesion testing methods described above. The results are shown in Table 7.

TABLE 7

|  | crosshatch adhesion | R % (average) | R % (standard deviation) |
|---|---|---|---|
| Example 2 | pass | 0.90 | 0.04 |
| Comparative Example E | fail | 0.90 | 0.07 |

N/A means not applicable

Example 3

The coating solutions were applied to Substrate B using a dip coating process. Metal clips were used to attach Substrate B onto a metal bar of a Velmax (Bloomfield, N.Y.) Unislide A2 dip coater so that the bottom of Substrate B was parallel to the lab bench top. Substrate B was immersed in the indicated coating solution and gradually pulled out at the indicated speed.

The abrasion-resistant coating solution was prepared by mixing 23.1 g of Binder-1 with 69.2 g of 1-methoxy-2-propanol, followed by adding 207.7 g of Zr-GPS and mixing until well blended.

The anti-reflective coating solution composition was prepared by mixing 6.22 g of Polymer A, 4.97 g of 5% by weight HCl/water solution, 374.95 g of 1-methoxy-2-propoanol, 403.77 g of 4-hydroxy-4-methyl-2-pentanone, and 38.85 g of Nanoparticle A.

Substrate B was first dip coated in the abrasion-resistant coating solution composition with a withdraw speed of 237 mm/min, and dried in an oven at 130° C. for 30 min. Then the coated article was dip coated in the anti-reflective coating solution composition with a withdraw speed of 186 mm/min, and dried in an oven at 130° C. for 3 hours.

Example 4

Example 4 was prepared similarly to Example 3 except that the anti-reflective coating solution composition used was prepared by mixing 16.67 g of Polymer A, 26.67 g of 5% by weight HCl/water solution, 381.67 g of 1-methoxy-2-propoanol, and 405.00 g of 4-hydroxy-4-methyl-2-pentanone.

Comparative Example F

Non-coated Substrate B.

The coated surface of each of Comparative Example F and Examples 3-4 was then tested following the Optical property testing, Cross-Hatch Adhesion testing, and Taber linear abrasion testing methods described above. The results are shown in Table 8.

TABLE 8

| Sample | T % | H % | crosshatch adhesion | Taber linear abrasion |
|---|---|---|---|---|
| Comparative Example F | 90.0% | 0.3% | N/A | 46% |
| Example 3 | 97.7% | 0.4% | pass | 18% |
| Example 4 | 95.4% | 0.5% | pass | 18% |

N/A means not applicable

All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:
1. A composite article comprising:
   a substrate; and on at least one face of the substrate, a multilayered coating is disposed, wherein the multilayered coating comprises:
   (i) an abrasion-resistant layer adjacent to the substrate, wherein the abrasion-resistant layer has an index of refraction greater than 1.55, wherein the abrasion-resistant layer comprises inorganic oxide nanoparticles and a polymer binder, wherein the abrasion-resistant layer has a thickness of at least 0.5 microns; and
   (ii) an antireflection layer adjacent to the abrasion-resistant layer opposite the substrate, wherein the antireflection layer has an index of refraction less than 1.48, and wherein the antireflection layer comprises a fluorosilane polymer, wherein the fluorosilane polymer comprises:
   at least one monomeric unit A represented by the formula

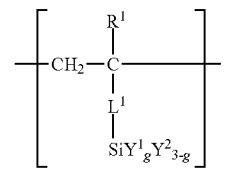

wherein
   $R^1$ represents H or methyl,
   $L^1$ represents a covalent bond or a divalent aliphatic group having from 1 to 10 carbon atoms,
   each $Y^1$ independently represents a hydrocarbyl group having from 1 to 6 carbon atoms,
   each $Y^2$ independently represents a hydrolyzable group,
   g is 0, 1, or 2; and
   at least one divalent monomeric unit B represented by the formula

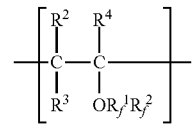

wherein
   $R^2$, $R^3$, and $R^4$ represent H, methyl, trifluoromethyl, or F, wherein at least one of $R^2$, $R^3$, and $R^4$ is F,
   $R_f^1$ represents a covalent bond or a divalent group selected from the group consisting of $-(CF_2O)_a-$, $-(CF_2CF_2O)_b-$, $-(CF_2CF_2CF_2O)_c-$, $-(CF_2CF_2CF_2CF_2O)_d-$, $-(CF_2CF(CF_3)O)_e-$, and combinations thereof, wherein a, b, c, d, and e represent integers in the range of from 0 to 130, and wherein $2 \leq a+b+c+d+e \leq 130$, and
   $R_f^2$ is a perfluoroalkyl group.

2. A composite article according to claim 1, wherein the fluorosilane polymer contains less than or equal to 0.49 percent by weight of fluorinated alkene.

3. A composite article according to claim 1, wherein the weight ratio of the at least one monomeric unit B to the at least one monomeric unit A is at least 0.8.

4. A composite article according to claim 1, wherein the average molar ratio of the at least one monomeric unit A to the at least one monomeric unit B is at least 1.

5. A composite article according to claim 1, wherein the substrate is a curved film or a complex curve.

6. A composite article according to claim 1, wherein the substrate comprises at least one of a plastic film, an eyewear lens, eyewear protection, and a safety shield.

7. A composite article according to claim 1, wherein the antireflection layer further comprises anisotropic silica nanoparticles.

8. A composite article according to claim 1, wherein the inorganic oxide nanoparticles comprise zirconia nanoparticles.

9. A composite article according to claim 1, wherein the polymer binder comprises an acrylic polymer comprising a quaternary ammonium group.

10. A composite article according to claim 1, wherein $R_f^1$ represents a covalent bond or a divalent group selected from the group consisting of $-(CF_2O)_a-$, $-(CF_2CF_2O)_b-$, $-(CF_2CF_2CF_2O)_c-$, $-(CF_2CF_2CF_2CF_2O)_d-$, $-(CF_2CF(CF_3)O)_e-$, and combinations thereof, wherein a, b, c, d, and e represent integers in the range of from 0 to 130, and wherein $2 \leq a+b+c+d+e \leq 130$.

11. A composite article according to claim 1, wherein the fluorosilane polymer further comprises:
p monomeric units C represented by the formula

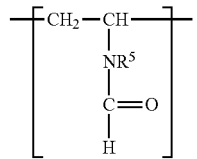

wherein $R^5$ represents H or methyl, wherein p is a positive integer.

12. A composite article according to claim 11, wherein on a relative molar basis, the fluorosilane polymer comprises from 9 to 11 moles of monomeric unit A, 8 to 10 moles of monomeric unit B, and 0.5 to 1.5 moles of monomeric unit C.

13. The composite article of claim 11, wherein the inorganic nanoparticles are silica.

14. A composite article according to claim 1, wherein $Y^2$ is selected from the group consisting of alkoxy groups having from 1 to 4 carbon atoms, alkanoyloxy groups having from 2 to 4 carbon atoms, a hydroxyl group, and Cl.

15. A composite article according to according to claim 1, wherein $R^2$, $R^3$, and $R^4$ represent F.

16. A composite article according to according to claim 1, wherein the at least one divalent monomeric unit B has an average sum of a+b+c+d+e in the range of from 30 to 40.

17. A composite article according to claim 1, wherein the Rq value for the surface topography of the antireflection layer is greater than 0.3 nm after a Fourier spatial filter with a high pass cutoff frequency of 10000 mm$^{-1}$ is applied.

18. A method of making a composite article, the method comprising:
providing a substrate;
disposing an abrasion-resistant layer on at least a portion of the substrate, wherein the abrasion-resistant layer has an index of refraction greater than 1.55, wherein the abrasion-resistant layer comprises inorganic oxide nanoparticles and a polymer binder; and
disposing an antireflection layer on at least a portion of the abrasion-resistant layer opposite the substrate, wherein the antireflection layer has an index of refraction less than 1.48, and wherein the antireflection layer comprises a fluorosilane polymer, wherein the fluorosilane polymer comprises:
at least one monomeric unit A represented by the formula

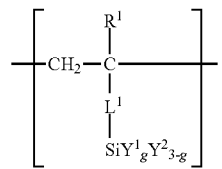

wherein
$R^1$ represents H or methyl,
$L^1$ represents a covalent bond or a divalent aliphatic group having from 1 to 10 carbon atoms,
each $Y^1$ independently represents a hydrocarbyl group having from 1 to 6 carbon atoms,
each $Y^2$ independently represents a hydrolyzable group,
g is 0, 1, or 2; and
at least one divalent monomeric unit B represented by the formula

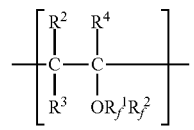

wherein
$R^2$, $R^3$, and $R^4$ represent H, methyl, trifluoromethyl, or F, wherein at least one of $R^2$, $R^3$, and $R^4$ is F,
$R_f^1$ represents a covalent bond or a divalent group selected from the group consisting of $-(CF_2O)_a-$, $-(CF_2CF_2O)_b-$, $-(CF_2CF_2CF_2O)_c-$, $-(CF_2CF_2CF_2CF_2O)_d-$, $-(CF_2CF(CF_3)O)_e-$, and combinations thereof, wherein a, b, c, d, and e represent integers in the range of from 0 to 130, and wherein $2 \leq a+b+c+d+e \leq 130$, and
$R_f^2$ is a perfluoroalkyl group.

19. A composition comprising:
a) a fluorosilane polymer comprising:
at least one monomeric unit A represented by the formula

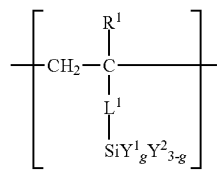

wherein
$R^1$ represents H or methyl,
$L^1$ represents a covalent bond or a divalent aliphatic group having from 1 to 10 carbon atoms,
each $Y^1$ independently represents a hydrocarbyl group having from 1 to 6 carbon atoms,
each $Y^2$ independently represents a hydrolyzable group,
g is 0, 1, or 2; and
at least one divalent monomeric unit B represented by the formula

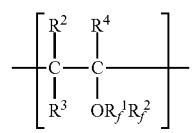

wherein
$R^2$, $R^3$, and $R^4$ represent H, methyl, trifluoromethyl, or F, wherein at least one of $R^2$, $R^3$, and $R^4$ is F, $R_f^1$ represents a covalent bond or a divalent group selected from the group consisting of $-(CF_2O)_a-$, $-(CF_2CF_2O)_b-$, $-(CF_2CF_2CF_2O)_c-$, $-(CF_2CF_2CF_2CF_2O)_d-$, $-(CF_2CF(CF_3)O)_e-$, and combinations thereof, wherein a, b, c, d, and e represent integers in the range of from 0 to 130, and wherein $2 \leq a+b+c+d+e \leq 130$, and $R_f^2$ is a perfluoroalkyl group; and b) inorganic nanoparticles having an average particle diameter of at most 100 nm.

* * * * *

UNITED STATES PATENT AND TRADEMARK OFFICE
CERTIFICATE OF CORRECTION

PATENT NO. : 10,213,993 B2
APPLICATION NO. : 15/105913
DATED : February 26, 2019
INVENTOR(S) : Chen-Ho et al.

It is certified that error appears in the above-identified patent and that said Letters Patent is hereby corrected as shown below:

In the Specification

Column 1,
Line 2, below "article" insert -- Cross Reference to related Applications
This application is a national stage filing under 35 U.S.C. 371 of PCT/US2014/070492, filed December 16, 2014, which claims the benefit of U.S. Application No. 61/918093, filed December 19, 2013, the disclosure of which is incorporated by reference in its/their entirety herein. --.

Column 6,
Lines 7 & 8, delete "hexamethydisilane" and insert -- hexamethyldisilane --, therefor.

Column 8,
Line 48, delete "R" and insert -- $R_f^2$ --, therefor.

Column 13,
Line 16, delete "1000" and insert -- 100° --, therefor.
Line 17, delete "1100." and insert -- 110°. --, therefor.

Column 16,
Line 16, delete "R³"" and insert -- $R^3$, --, therefor.

Column 19,
Line 53, delete "Y"" and insert -- $Y^2$ --, therefor.

Column 21,
Line 47, delete "an" and insert -- An --, therefor.

Signed and Sealed this
Seventh Day of May, 2019

Andrei Iancu
*Director of the United States Patent and Trademark Office*

Column 23,
Line 21, delete "10 m×10 m" and insert -- 10 μm×10 μm --, therefor.

Column 24,
Line 28, delete "methacylate" and insert -- methacrylate --, therefor.

Column 28,
Line 66, delete "Velmax" and insert -- Velmex --, therefor.

Column 29,
Line 11, delete "propoanol," and insert -- propanol, --, therefor.
Line 26, delete "propoanol," and insert -- propanol, --, therefor.

In the Claims

Column 31,
Line 37, in Claim 15, after "according to" delete "according to".
Line 39, in Claim 16, after "according to" delete "according to".